United States Patent [19]
Lamy

[11] Patent Number: 6,001,010
[45] Date of Patent: Dec. 14, 1999

[54] FLEXIBLE SHEATH FOR THE TRANSFER OF CASINGS TO A STUFFING CANULA

[76] Inventor: Christian Lamy, 9 rue de la Fontaine-Sainte- 37260, Artannes-Indre, France

[21] Appl. No.: 08/717,186

[22] Filed: Sep. 20, 1996

Related U.S. Application Data

[63] Continuation of application No. 08/244,407, filed as application No. PCT/FR92/01096, Nov. 25, 1992, abandoned.

[30] Foreign Application Priority Data

Nov. 26, 1991 [FR] France .................. 91 14582

[51] Int. Cl.⁶ .................. A22C 13/00
[52] U.S. Cl. .................. 452/32; 452/33
[58] Field of Search .................. 452/32, 33, 34

[56] References Cited

U.S. PATENT DOCUMENTS

| | | |
|---|---|---|
| 1,837,280 | 12/1931 | Mumm . |
| 3,122,779 | 3/1964 | Blechschmidt .................. 452/33 |
| 3,411,177 | 11/1968 | McMillan .................. 452/33 |
| 3,826,852 | 7/1974 | Levaco . |
| 4,363,819 | 12/1982 | Steffen .................. 452/33 |
| 4,571,922 | 2/1986 | Steffen .................. 452/33 |

FOREIGN PATENT DOCUMENTS

| | | | |
|---|---|---|---|
| 2 462 871 | 2/1981 | France .................. | A22C 13/00 |
| WO-A-9 013 226 | 11/1990 | France .................. | A22C 13/00 |
| 2 733 996 | 2/1979 | Germany .................. | A22C 13/00 |
| 407 794 | 9/1966 | Switzerland .................. | A22C 13/02 |
| 9988410 | 7/1965 | United Kingdom .................. | A22C 11/00 |
| 4924 | 5/1990 | WIPO .................. | 452/32 |

*Primary Examiner*—Willis Little
*Attorney, Agent, or Firm*—Blakely Sokoloff Taylor & Zafman

[57] ABSTRACT

The present invention relates to a flexible sheath which may be opened longitudinally and used for the transfer of casings to a stuffing canula comprised of one or a plurality of flexible bands (1) having a generally oblong shape, the two opposite longitudinal sides of which are rectilinear and each have a projecting rib (2) or a hollow groove (3), forming the male and female complementary elements of a longitudinal press closure (4), capable of being opened and closed a plurality of times, and method for placing casings used in pork-butchery on the stuffing canula (6) for the fabrication of sausages or dried sausages.

19 Claims, 2 Drawing Sheets

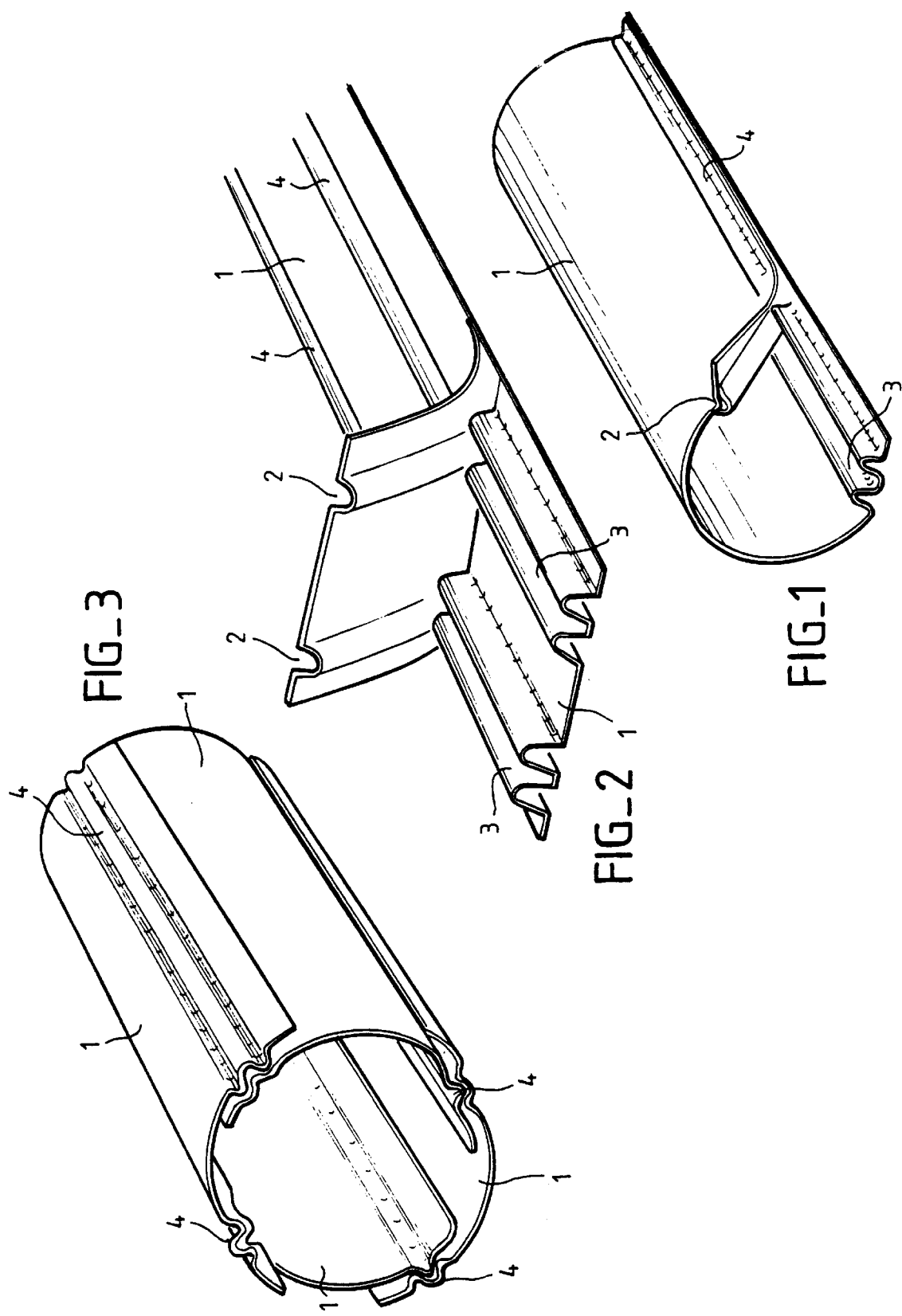

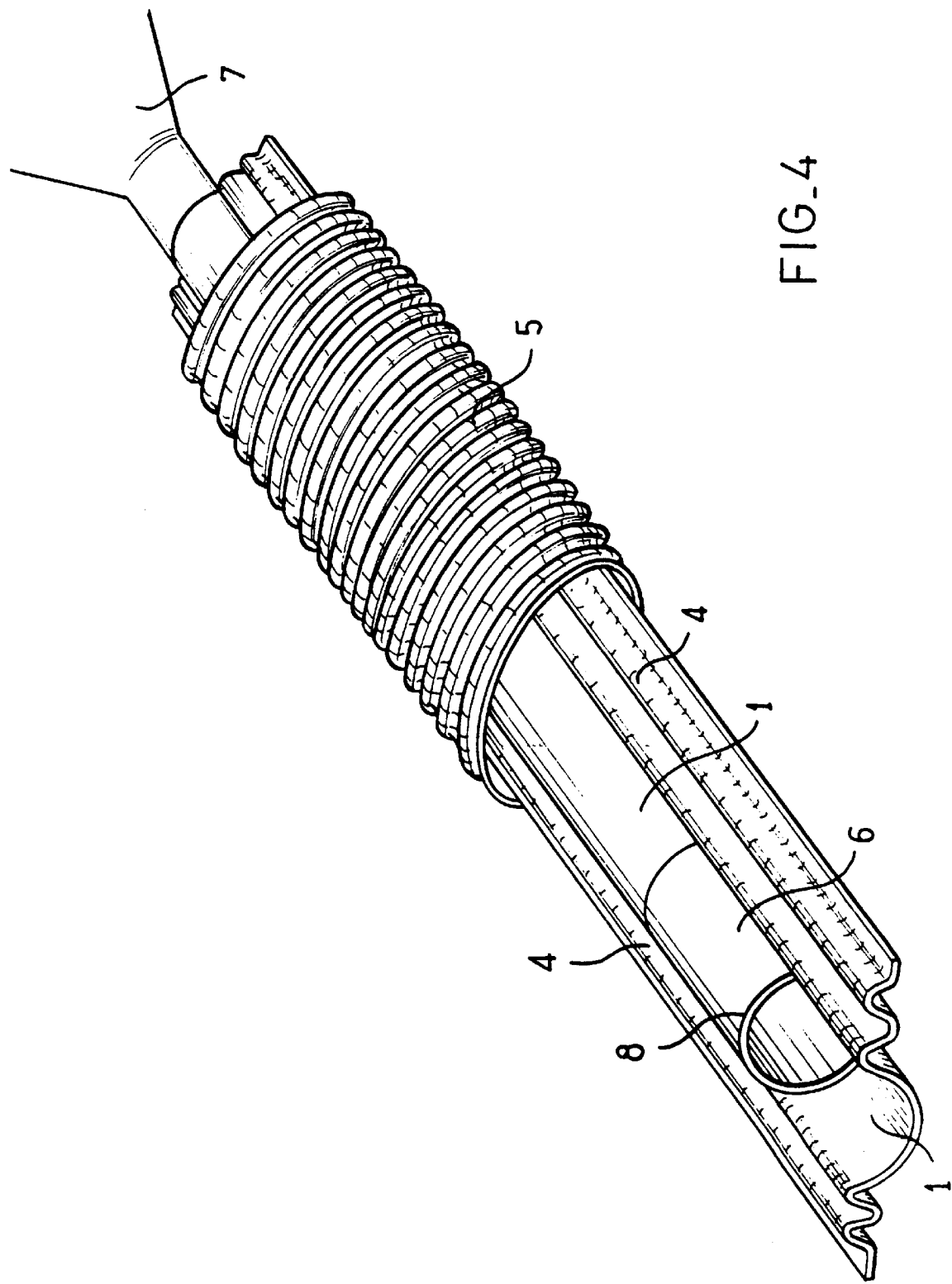
FIG._4

FLEXIBLE SHEATH FOR THE TRANSFER OF CASINGS TO A STUFFING CANULA

This is a continuation of application Ser. No. 08/244,407 filed May 23, 1994 which is 371 of PCT/FR92/01096 filed Nov. 25, 1992 now abandoned.

BACKGROUND OF THE INVENTION

1. Field of the Invention

The present invention relates to a flexible sheath intended for transferring casings used in butchery onto a carrier tube, for sausage production.

2. Description of Related Art

The casings used in butchery are generally natural sheep, pig or cow casings. They can either be used singly, or be juxtaposed, or be overlapped. The casings are generally delivered preassembled on flexible sheaths or rigid tubular members, then transferred onto the carrier tube.

Numerous types of flexible sheaths made of plastic are currently used by butchers for transferring casings onto a tube, in particular the sheath described in French Patent No. 2,462,871 which can be withdrawn from the carrier tube by tearing along a pre-cutout of the sheath.

Such a sheath is not, however, free from drawbacks. In fact, a pre-cutout can have zones of higher strengths following an unequal perforation, which can cause a discontinuity in the movement of withdrawing the sheath, and locally cause splitting or superposition of the casings. Furthermore, when the sheath comprises a double pre-cutout (in order to facilitate manufacture of the sheath), the simultaneous breaking of the two pre-cutouts can lead to the formation of a plastic tongue which, in the event of a handling error, may cause damage to the casings, or even be carried into the sausage meat during the securing. Finally, this sheath is not reusable.

It was therefore necessary to remedy these drawbacks. Now, it has unexpectedly been found that elements otherwise known for leaktight closure of plastic packaging bags can be favourably used for transferring the casings. These elements known for the solidity of their closure allow easy and controlled opening of a flexible sheath intended for transfer onto a carrier tube.

SUMMARY OF THE INVENTION

The present invention therefore relates to a flexible sheath which can be opened longitudinally and is intended for transferring onto a carrier tube, consisting of one or more flexible strips (1) of generally oblong shape whose two longitudinal opposite sides are straight and each have a projecting rib (2) or a hollow groove (3), complementary male and female elements of a longitudinal press closure (4), which is capable of being opened and closed a plurality of times.

The closure of the complementary male (2) and female (3) elements leads to the formation of the sheath according to the invention, whilst its opening allows it to be withdrawn with ease after the casing has been transferred onto the carrier tube.

Such male ribs (2) and female grooves (3) forming a press closure are described in the prior art as, for example, in French Patents 1,492,413, 1,504,276 or 1,517,531.

BRIEF DESCRIPTION OF THE DRAWINGS

The features and advantages of the present invention will become apparent from the following detailed description in which:

FIG. 1 illustrates an embodiment of the flexible sheath comprising a single flexible strip.

FIG. 2 illustrates a first embodiment of the flexible sheath comprising a plurality of flexible strips.

FIG. 3 illustrates a second embodiment of the flexible sheath comprising a plurality of flexible strips.

FIG. 4 illustrates an embodiment of the flexible sheath having a pair of flexible strips.

DETAILED DESCRIPTION OF THE PRESENT INVENTION

Preferably, the flexible sheath according to the invention consists of at least one strip (1) of synthetic polymer, in particular polyethylene. The longitudinal closure (4) capable of being opened and closed a plurality of times furthermore allows reuse of the sheath since the closure (4), once opened, can be reclosed so as again to form a sheath which can be used for a new casing transfer. This additional and to say the least unexpected aspect of the invention is nonetheless important since it makes it possible at the same time to reduce the costs of employing the sheath, to preserve the environment by reuse of a synthetic material which is often difficult to recycle and to shield the product from the constant possibility of a price rise of the raw materials necessary for its manufacture.

The flexible sheath can consist of a single flexible strip (1) which is closed on itself by joining the two opposite sides which have the complementary closure elements (2, 3) or of a plurality of flexible strips (1) connected together by complementarity of shape of the longitudinal closure elements (2, 3) made on each longitudinal side of the various flexible strips (1).

The flexible sheath of the invention has an equal number of longitudinal closures (4) and flexible strips (1) which make it up. The oblong strips (1) are generally of rectangular or trapezoidal shape. It is not necessary for the complementary male (2) or female (3) closure elements on the two opposite longitudinal sides of the flexible strip (1) to be parallel. In fact, only their straight character is necessary to ensure the complementarity of the closure elements (2, 3) and easy opening when transferring the casings onto the carrier tube. For this purpose, a flexible strip of trapezoidal shape makes it possible to obtain a sheath of conical shape which can make it easier for the latter to be withdrawn.

When the flexible strip (1) has mutually parallel closure (4) elements (2, 3), the strip is advantageously inscribed in a rectangle of length between 10 and 70 cm, preferably between 20 and 40 cm, with a length/width ratio of between 2 and 40, preferably of between 10 and 35.

FIGS. 1 to 3 represent three particular examples of sheaths illustrating the present invention without intending to limit the scope thereof. The following description of these preferential embodiments of the invention will make it possible to bring out its principal characteristics.

FIG. 1 represents a flexible sheath according to the invention consisting of a single flexible strip (1). It has, on its two sides which are opposite in the length direction, on the one side a solid rib (2), the male element, and on the other side a hollow groove (3), the female element, the complementary elements of a closure (4). The sheath is formed, closed on itself by joining the two sides supporting the complementary elements.

FIGS. 2 and 3 represent models of sheaths consisting of a plurality of flexible strips (1). FIG. 2 represents a sheath consisting of two strips (1) connected by two longitudinal closures. In this particular case, a first strip (1) supports the two male elements (2) of the closure (4), while the second strip (1) supports the two corresponding complementary female elements (3) which are necessary for the two longitudinal closures (4), joining the two flexible strips (1), so as to form a sheath with two elements. It can obviously be envisaged to form one sheath with two elements by joining two flexible strips (1) each supporting a male element (2) and a female element (3) as represented in FIG. 1, the sheath being formed by joining the male element (2) of one strip (1) with the female element (3) of the other strip (1) so as to form the two longitudinal closures (4) which are necessary in order to obtain a sheath according to the invention. FIG. 3 is a variant, with four flexible strips (1) and four longitudinal closures (4), of the sheath in FIG. 2.

It will be noted that in all cases the total number of male elements (2) and the total number of complementary female elements (2) which is necessary in order to obtain a sheath are equal to the numbers of flexible strips which make it up.

The flexible sheath according to the invention is capable of being easily opened longitudinally by simple pulling on the sheath. This pulling leads to the opening of one of the longitudinal closures (4) of the sheath by separation of the male (2) and female (3) elements which make it up starting from the end of the sheath which is pulled on. The complementary male (2) and female (3) elements can be previously separated at this same end, so as to promote opening of the longitudinal closure (4) by simple pulling.

In the case of a sheath consisting of a plurality of flexible strips (1), as represented by FIGS. 2 and 3, the sheath can also be opened by pulling on at least one of the strips which make it up, so as to make the male elements (2) of at least two longitudinal closures (4) slide in their complementary female elements (3) along the axis of the sheath.

FIG. 4 illustrates the example of a flexible sheath with two strips (1) and two closures (4) supporting the casing (5) and fitted over the carrier tube (6). The various possible ways of opening the longitudinal closures (4) are then the following:

1. The two flexible strips (1) are pulled in opposite directions along the axis of the tube (6), one towards its base (7), and the other towards its free end (8) so as to make the male element (2) of each closure (4) slide in the corresponding complementary female element (3). As a variant of this first way of opening, it is possible to hold one of the strips (1) on the tube (6) using a hook or by hand, and to pull the other strip (1) along the axis of the tube (6) towards its free end (8).

2. Both flexible strips (1) are pulled in the same direction along the axis of the tube (6), towards the base (7) of the latter and at least one of the closures (4) is opened by passing a guide between the male element (2) of the closure (4) and its corresponding complementary female element (3); the guide can be either the tube (6), or its base (7), or alternatively an element fixed perpendicularly to the latter near to the base (7), in particular using a moving bolt system.

The sheath according to the present invention can be opened by applying a pulling force less than 0.03 N, preferably between 0.005 N and 0.025 N, to at least one of the strips (1).

In order to facilitate handling of the flexible sheath according to the invention, the strips (1) which make it up can be supplemented with various elements such as handles, loops or hooks, or simply be pierced in the strip (1) at its ends.

Furthermore, given that the closure must have a good compromise between durability for pulling and opening by sliding, the person skilled in the art will be able to choose the ideal form of the male element (2) of the closure (4) and its complementary female element (3), in particular chosen from among the forms described in French Patents No. 1,492,413, 1,504,276, 1,517,531 and 2,024,327.

Finally, the present invention also relates to a method for placing casings (5) used in butchery for sausage production onto a carrier tube (6), in which a flexible sheath according to the invention, defined previously, supporting the casings (5), is fitted over the carrier tube (6), and then the flexible sheath is withdrawn by opening at least one of the longitudinal closures (4) by a pulling force generally parallel to the axis of the tube (6), on at least one of the strips (1) which make up the sheath.

As previously indicated, since the force necessary to open the longitudinal closures (4) of the sheath is small, the gentle and regular movement of withdrawing the latter makes it possible correctly to control the transfer of the casing (5) onto the tube (6). Furthermore, it is possible after this transfer to reclose the sheath and to reuse it under identical conditions with repetition of results at each transfer.

What is claimed is:

1. A flexible sheath system used in butchery for sausage production, said flexible sheath system comprising:

(1) at least one flexible strip with a predetermined length having a pair of longitudinal opposite sides that are straight, wherein each of said pair of longitudinal sides of said at least one flexible strip includes a closure device, which is capable of being opened and closed a plurality of times to form a longitudinal pressure closure, said at least one flexible strip for being enclosed by at least one natural casing; and (2) a carrier tube, wherein said flexible strip provides inner support to said at least one natural casing and is removably disposed between said carrier tube and said at least one natural casing.

2. The flexible sheath according to claim 1, wherein said at least one flexible strip is a single flexible strip which is closed on itself by aligning and joining a first closure element of a first longitudinal side of a pair of longitudinal sides to a second closure element of a second longitudinal side of the pair of longitudinal sides, said second closure element being complementary in shape to said first closure element.

3. The flexible sheath according to claim 1, wherein the number of flexible strips forming the flexible sheath is equal to one-half the number of closure elements.

4. The flexible sheath according to claim 1, wherein the at least one flexible strip is configured in a rectangle having a length ranging from ten centimeters to seventy centimeters, and a length-to-width ratio ranging from two to forty.

5. The flexible sheath according to claim 1, wherein said at least one flexible strip is a single flexible strip.

6. The flexible sheath according to claim 1, wherein said at least one flexible strip is a plurality of flexible strips.

7. The flexible sheath according to claim 6, wherein the plurality of flexible strips are connected together by a male closure element of one of a pair of longitudinal sides of a first flexible strip aligned with and joined to a female closure element of a longitudinal side of a second flexible strip aligned with the first flexible strip so as to form the longitudinal pressure closure.

8. The flexible sheath according to claim 1, wherein said flexible sheath can be opened easily by pulling on the at least one flexible strip.

9. The flexible sheath according to claim 6, wherein the flexible sheath can be opened easily by pulling on at least one of the plurality of flexible strips forming the flexible sheath.

10. The flexible sheath according to claim 1, wherein the flexible sheath is opened by applying a pulling force less than 0.03 Newtons, preferably between 0.005 Newtons and 0.025 Newtons, to the at least one flexible strip.

11. A method for placing natural casings used in butchery for sausage production onto a carrier tube, the method comprising:

providing the carrier tube;

fitting a flexible sheath over the carrier tube; and withdrawing the flexible sheath by opening at least one longitudinal pressure closure by applying a pulling force generally parallel to an axis of the carrier tube on at least one flexible strip of the flexible sheath.

12. The flexible sheath according to claim 1, wherein said at least one flexible strip includes a plurality of flexible strips connected together by aligning and joining complementary closure elements between different flexible strips.

13. A flexible sheath system used in butchery for sausage production, the flexible sheath system comprising:

a natural casing;

a carrier tube disposed to receive the natural casing;

a flexible sheath providing inner support to the natural casing, the flexible sheath having at least one flexible strip, the at least one flexible strip having at least a first closure element on a first side of the at least one flexible strip, the first closure element being removably coupled to a second closure element to form the flexible sheath, wherein the second closure element is complementary in shape to the first closure element.

14. The flexible sheath system of claim 13, wherein the second closure element is located on a second side of the at least one flexible strip, the second side being parallel to the first side.

15. The flexible sheath system of claim 13, wherein the first closure element is located on a first flexible strip and the second closure element is located on a second flexible strip.

16. Method for using a flexible sheath to place casings used in butchery for sausage production onto a carrier tube (6), said flexible sheath including at least one flexible strip (1) having a predetermined length and a first longitudinal side that opposes a second longitudinal side, wherein the first and second longitudinal sides includes at least one closure device (4), said closure device (4) having a first end and a second end, wherein said closure device (4) is capable of being closed a plurality of times to form a longitudinal pressure closure and capable of being open a plurality of times, said method comprising the steps of:

a) closing said at least one flexible strip by engaging the entire length of the first longitudinal side with the entire length of the second longitudinal side;

b) enclosing said closed at least one flexible strip within a natural casing (5);

c) partially opening said first end of said at least one closure device (4);

d) partially opening said second end of said at least one closure device (4);

e) providing inner support to said natural casing by fitting said partially open second end of said at least one flexible strip over said carrier tube (6); and f) completely opening said at least one closure device (4) such that said flexible sheath is withdrawn from the tube and said casing is deposited onto the tube.

17. The method defined by claim 16 wherein said flexible sheath has a generally oblong shape.

18. The method defined by claim 16 wherein said flexible sheath includes on one side a rib and on an other side a complementary groove.

19. The method defined by claim 18 wherein said rib and complementary groove form a press closure.

* * * * *

UNITED STATES PATENT AND TRADEMARK OFFICE
CERTIFICATE OF CORRECTION

PATENT NO. : 6,001,010
DATED : December 14, 1999
INVENTOR(S) : Lamy

It is certified that error appears in the above-identified patent and that said Letters Patent is hereby corrected as shown below:

On the Title Page:

Item [56], line 13, delete "Switzerland" and insert --France--

Item [56], line 14, delete "9988410" and insert --988410--.

Signed and Sealed this

Tenth Day of April, 2001

Attest:

NICHOLAS P. GODICI

Attesting Officer     Acting Director of the United States Patent and Trademark Office